United States Patent [19]
Quarve

[11] 3,971,404
[45] July 27, 1976

[54] HYDRAULIC RUNAWAY CONTROL VALVE

[75] Inventor: Vernon Kenneth Quarve, Minneapolis, Minn.

[73] Assignee: Graco Inc., Minneapolis, Minn.

[22] Filed: June 17, 1974

[21] Appl. No.: 480,124

[52] U.S. Cl. ............................ 137/462; 137/464
[51] Int. Cl.² ........................................ F16K 17/20
[58] Field of Search .......... 137/460, 462, 464, 465, 137/458

[56] References Cited
UNITED STATES PATENTS

| | | | |
|---|---|---|---|
| 820,598 | 5/1906 | Petersen | 137/460 |
| 1,294,151 | 2/1919 | Page | 137/271 |
| 1,406,026 | 2/1922 | Jensenius | 137/494 |
| 2,017,500 | 10/1935 | Hood | 137/464 |
| 2,756,740 | 7/1956 | Deane | 251/321 X |
| 2,765,801 | 10/1956 | Selim | 137/464 X |
| 2,851,056 | 9/1958 | MacGlashan, Jr. | 137/464 |
| 3,038,557 | 6/1962 | Callahan | 137/464 X |
| 3,138,174 | 6/1964 | Gilpin | 137/498 |

FOREIGN PATENTS OR APPLICATIONS 1,184,720  3/1970  United Kingdom.................. 137/462

*Primary Examiner*—Robert G. Nilson
*Attorney, Agent, or Firm*—Paul L. Sjoquist

[57] ABSTRACT

Apparatus for controlling the flow of fluid in pressurized lines; and for closing a valve and stopping said flow whenever downstream pressure drops below a predetermined value, is disclosed. The apparatus comprises a manually-operated valve for starting fluid flow and a spring-biased sequencing valve for stopping fluid flow, with fluid channels connecting the manual valve with the sequencing valve.

1 Claim, 2 Drawing Figures

HYDRAULIC RUNAWAY CONTROL VALVE

This invention relates to an apparatus for controlling the flow of hydraulic fluid in hydraulic fluid pressure lines, and for automatically stopping such flow whenever downstream pressure drops below a predetermined value. The invention is particularly adaptable for use in conjunction with a hydraulically operated motor, to prevent a runaway condition with said motor when the motor load drops below a predetermined level.

Hydraulically operated motors are typically supplied with hydraulic fluid from a variable volume, pressure compensated hydraulic pump. This pump provides hydraulic fluid through a flow control valve and high pressure delivery lines to the hydraulic motor, which reciprocates to drive a load device. A typical load device is a material pump, mechanically connected with the reciprocating portion of the hydraulic motor, and having a pump piston and cylinder for drawing material into the cylinder during a first stroke of the hydraulic motor and forcing the material from the cylinder during the second stroke of the hydraulic motor. In industrial applications a hydraulic fluid supply source may be remotely located and may supply a large number of different hydraulic motors, each of which are used to drive varying types of pumps for delivering material under high pressure. These industrial applications generally require long hydraulic pressure lines between the hydraulic fluid supply source and the various connected hydraulic motors, which may be dispersed about the industrial plant.

The hydraulic motor-pump combination is usually inserted over and into a commercial size drum of material such as paint, and this combination serves to pump the material to some delivery apparatus such as a paint spray gun. If the barral or drum containing the pumped material becomes empty, or any of the paint delivery system suffers a breakdown, the hydraulic motor suddenly becomes unloaded and begins reciprocating at a high rate of speed in an attempt to build up and maintain the output loading pressure. This high rate of reciprocation, if unchecked, often results in the destruction or damage of the reciprocating parts of the pump and motor. Thus, it is advantageous to provide an apparatus for responding to a pressure breakdown situation to shut off the hydraulic fluid supplied to the motor in the event of pressure loss. The present invention accomplishes this purpose, and further provides an apparatus for shutting off the hydraulic fluid delivery system in the event of a pressure drop caused by a break in the hydraulic fluid delivery line downstream of the apparatus.

It is therefore an object of this invention to provide an apparatus for controlling the hydraulic motor to prevent the condition of hydraulic runaway.

It is another object of this invention to provide an apparatus for sensing pressure drops in fluid delivery lines below a predetermined level, and to shut off the flow through the delivery lines when such pressure drops occur.

It is another object of this invention to provide an apparatus for controlling the flow of hydraulic fluid into a hydraulic motor and pump combination whereby the loss of pump's material causes the hydraulic motor to cease its reciprocating motion.

It is yet another object of this invention to provide a hydraulic pressure regulating device which may be manually set to monitor line pressure, and which automatically closes when said line pressure drops below a predetermined magnitude to block the pressure delivery line.

These and other objects will become apparent from a reading of the following specification and claims, and with reference to the appended drawings in which:

Figure 1:
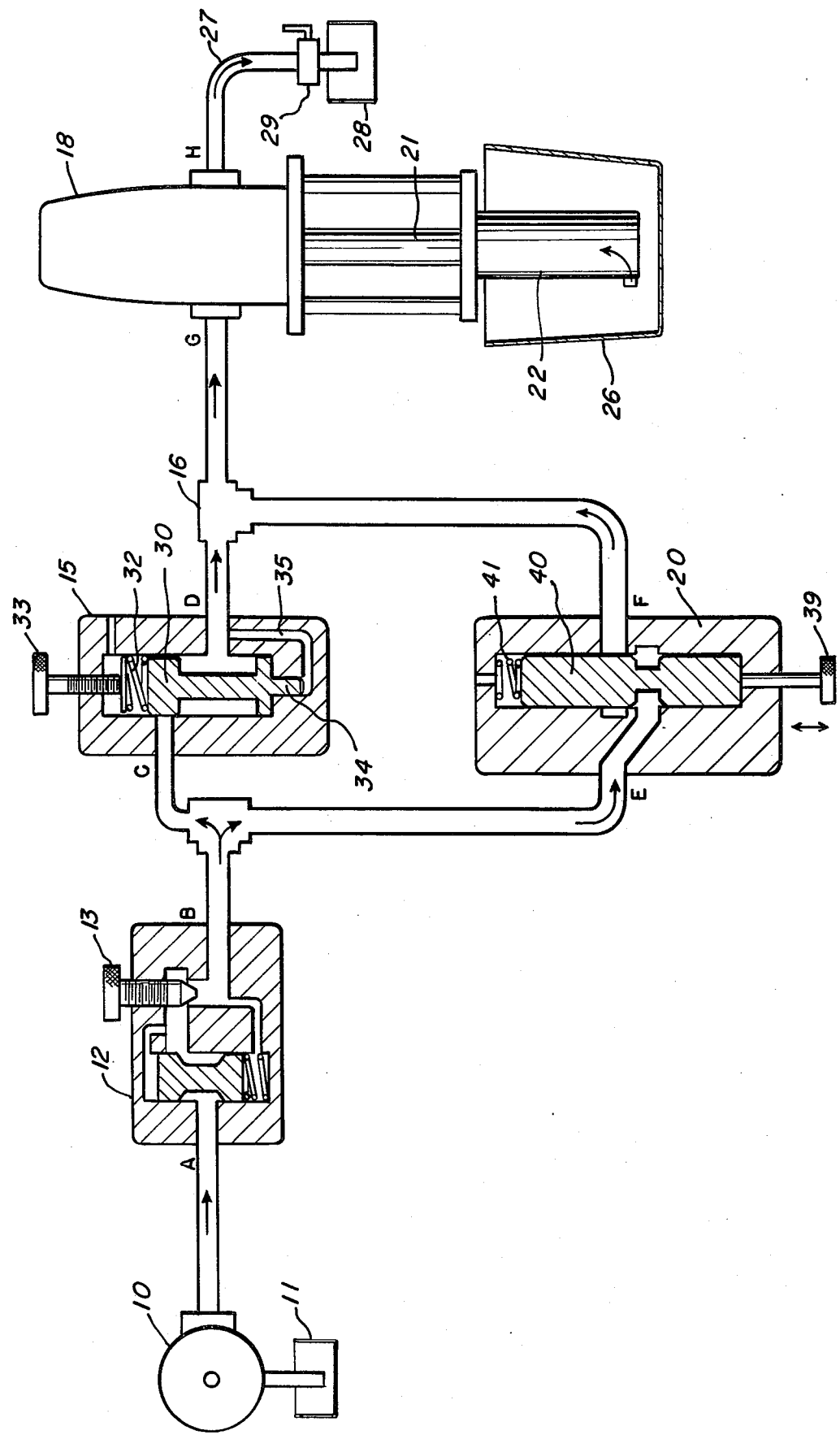
FIG. 1 is a diagrammatic view of the invention used in a hydraulic delivery system.

Referring first fo FIG. 1, a hydraulic pump 10 is shown symbolically. Pump 10 draws hydraulic fluid from a reservoir 11 and feeds it through a flow control valve 12. The hydraulic fluid flow rate is adjusted by means of needle valve 13 which forms a part of flow control valve 12. The output of flow control valve 12 is connected via suitable high pressure lines, to the invention, comprised of sequence valve 15 and starting valve 20. The outputs of valves 15 and 20 are combined into a single line at T-connection 16, and delivered to hydraulic motor 18. Hydraulic motor 18 may be any of a number of standard commercially available motors, as for example the "Viscount" model manufactured by the assignee of the present invention. Hydraulic motor 18 is mechanically connected via a connecting rod 21 to a reciprocating pump 22. Pump 22 is immersed in a pumping fluid reservoir 26 which is typically filled with paint or other materials to be delivered to a suitable delivery apparatus. This delivery apparatus is symbolically illustrated in FIG. 1 as a delivery line 27 feeding into a reservoir 28 via dispensing valve 29. However, in a typical application wherein reservoir 26 contains paint, the delivery line 27 may be a paint hose attached to a suitable paint spray gun, and reservoir 28 would then be the surface to be coated by the paint.

The arrows shown within the various delivery lines of FIG. 1 illustrate the flow of fluid, both the hydraulic fluid to the hydraulic motor and pumping fluid to the delivery apparatus. Once the hydraulic fluid delivery lines are filled, the actual flow rate of hydraulic fluid is minimal, the primary object being to maintain a high hydraulic pressure in said lines to create the driving force necessary for reciprocating the hydraulic motor. Hydraulic motor 18 is typically reciprocated by means of internal valving, which is toggled at the end of each delivery stroke to cause the hydraulic fluid to force the motor piston in the opposite direction. This reciprocating motion continues until a back pressure is built up within the pump 22 cylinder which is equal and in opposition to the hydraulic fluid pressure inside the hydraulic motor 18. The balance of these pressures is ultimately obtained by the reciprocation of hydraulic motor 18 in an amount equal to deliver pumped material to delivery line 27 at a rate sufficient to maintain the desired pressure in delivery line 27. The release of material from delivery line 27 is symbolically illustrated in FIG. 1 as being controlled by a dispensing valve 29. If, for example, dispensing valve 29 is open to allow the excape of material into reservoir 28, hydraulic motor 18 will reciprocate at a rate sufficient to deliver this material at the pressures dictated by the constraints in the delivery line, including the setting of valve 29 and the size of the output orifice from delivery line 27. A return hydraulic fluid line from motor 18 back to reservoir 11 is not shown in the figures, but is necessary in actual embodiments.

The inventive portion of the system shown in FIG. 1 is contained within the apparatus associated with, and included within, sequence valve 15 and starting valve 20. Sequence valve 15 has an internally slidable spool 30 which is reciprocable within the valve 15 inner chamber. Spool 30 is constrained downwardly by means of a spring 32 which may be variably biased by threaded adjusting nut 33. The bottom end of spool 30 has a projecting piston 34 which is seated within a complementary-shaped cylinder. A passage 35 interconnects the output of valve 15 with the bottom surface of piston 34, and serves to provide a passage for transferring the pressure felt at the output of valve 15 back to the end of piston 34. This feedback pressure causes a force to move piston 34 upwardly under suitable conditions as will be hereinafter described.

Starting valve 20 has an internally slidable spool 40 which is movable upward against a spring bias 41. Spool 40 is activated manually by means of tab 39, which projects through a suitable passage in the valve to come into contact with the bottom surfaces of spool 40. When starting valve 20 is in the position illustrated in FIG. 1, it closes the internal valve passages and prevents fluid flow between valve input E and valve output F. However, when tab 39 is depressed against the force of spring 41, spool 40 moves upwardly to open a passage between inlet E and outlet F, thereby allowing the flow of fluid through the valve.

Sequence valve 15 is normally closed in the position illustrated in FIG. 1. In this position, under typical operating conditions, the fluid pressure at valve inlet C is high and the fluid pressure at valve outlet D is low. The low fluid pressure at outlet D is also present within the interior of the valve, and particularly through passage 35 and against the bottom surface of piston 34. For so long as the condition of high inlet pressure and low outlet pressure exists, spool 30 will remain in the position shown in FIG. 1, and sequence valve 15 will remain closed. However, when the pressure at outlet D increases above a predetermined level determined by the setting of adjusting nuts 33, sufficient force is urged against the bottom surface of piston 34 to cause spool 30 to move upwardly. When spool 30 moves a distance sufficient to cause clearance from the inlet passageway at C, the valve opens and fluid flow is possible through the valve. The procedure for causing this operation to occur will now be explained.

Before the system is started into operation the positions of the valves are as illustrated in FIG. 1. Hydraulic pump 10 is operating and creates a high hydraulic fluid pressure at sequence valve 15 inlet C and starting valve inlet E. However, since both of these valves are closed, the pressure at outlets D and F respectively are both low. A similar low hydraulic fluid pressure is presented to hydraulic motor inlet G, and the hydraulic motor is therefore not reciprocating. To start the operation of the hydraulic motor, the operator depresses tab 39 and holds it in a depressed state for a short period of time. When tab 39 is depressed, hydraulic fluid flow through valve 20 immediately begins, and a high pressure develops at valve outlet F, as well as at hydraulic motor inlet G. This high hydraulic pressure is also present at sequence valve 15 outlet D and within sequence valve 15 passage 35. The high pressure in passage 35 causes piston 34 to move upwardly against the force of spring 32. Spool 30 moves upwardly, opening sequence valve 15 and allowing fluid flow through the valve. This fluid flow occurs nearly instantaneously upon the operator's depressing of tab 39, and he may thereby immediately release tab 39 and fluid flow through the system will continue. Sequence valve 15 is thereafter held in an open position because the hydraulic fluid pressure at outlet D continues to be sent through passage 35 and continues to hold piston 34 against the force of spring 32.

In the event a pressure drop occurs downstream from sequence valve 15, as might be caused by a break in the hydraulic supply line, the pressure at valve outlet D immediately drops. This pressure drop passes through passage 35 to piston 34, removing the holding force against piston 34 and causing spring 32 to force spool 30 downwardly. When spool 30 moves downwardly, it blocks inlet passage C and thereby closes valve 15. Since starting valve 20 is normally closed, the closing of sequence valve 15 immediately shuts off all hydraulic fluid to hydraulic motor 18 and causes hydraulic motor 18 to cease reciprocating. A similar result obtains when the pumping material in reservoir 26 becomes depleted. In this case, hydraulic motor 18 no longer has any pumping fluid pressure to work against and it begins reciprocating rapidly. This action causes an immediate drop in hydraulic pressure in hydraulic inlet G and subsequently at sequence valve outlet D. As hereinbefore described, the pressure drop is sensed by piston 34 and again sequence valve 15 closes. Thus, the condition commonly known as hydraulic runaway is prevented from occurring by immediately discontinuing the hydraulic pressure in the hydraulic motor delivery line to prevent the motor from reciprocating at a high rate of speed under no load conditions.

Figure 2:
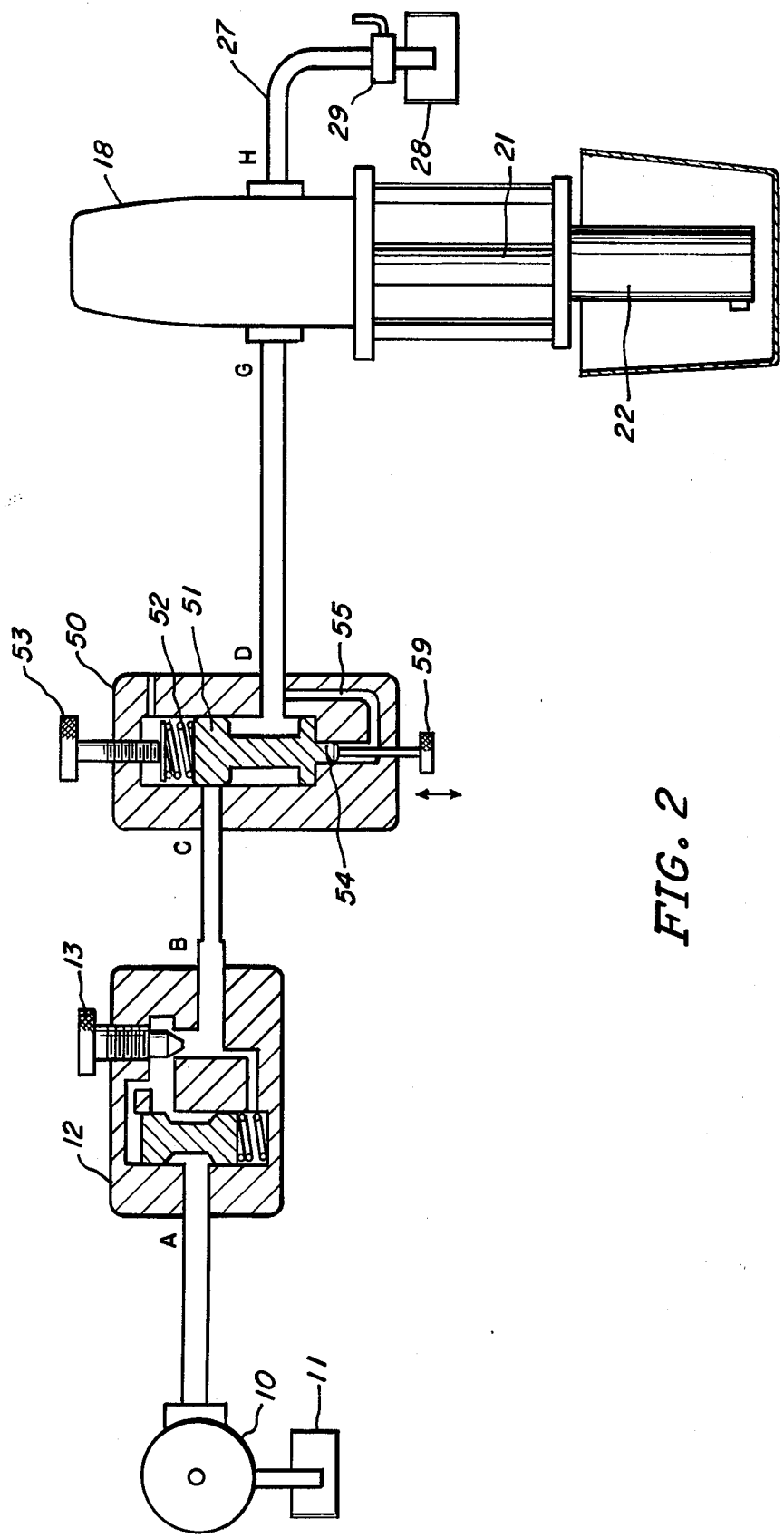
FIG. 2 is an alternative embodiment of the invention.

FIG. 2 illustrates an alternative embodiment of the invention, together with a system incorporating the invention. The hydraulic pump 10 is shown connected to a flow control valve 12, which valve adjustably controls hydraulic fluid flow by means of needle valve 13. The flow control valve 12 is connected to a sequence and starting valve 50, which in turn drives hydraulic motor 18 in the manner as hereinbefore described. Sequence and starting valve 50 has a internal chamber slidably housing spool 51. Spool 51 is biased downwardly by compression spring 52, which in turn is adjustably compressible by means of threaded adjusting nut 53. The bottom portion of spool 51 has an extended piston section 54 which slides within an appropriate passage. Spool 51 may be forced upward by depressing starting tab 59, which bears against the lower surface of piston 54. A passage 55 connects the lower surface of piston 54 with the outlet D of valve 50.

Under initial starting conditions spool 51 is in the position illustrated in FIG. 2, with a high hydraulic pressure present in the lines up to the inlet C of valve 50. The closed position of spool 51 prevents hydraulic fluid from passing through valve 50 to the outlet D, and thereby prevents operation of hydraulic motor 18. To start the motor into operation, the operator depresses starting tab 59, raising spool 51 and opening the valve parts between inlet C and outlet D. Hydraulic fluid then flows through the valve to hydraulic motor 18, and high hydraulic pressure is present at outlet D. This pressure is sensed via passage 55 by piston 54, and the upward force caused by said pressure holds spool 51 in an open position against the force of spring 52. As hereinbefore described, a sudden pressure drop downstream from valve 50 will be sensed via passage 55 at piston 54, causing spool 51 to drop into closing position. This shuts off the hydraulic supply to hydraulic motor 18 and the motor ceases reciprocating.

Having thus described a preferred embodiment of my invention, and an alternate preferred embodiment of my invention, it is apparent that detail changes in the structure of the various inventive elements may be made within the spirit and scope of the invention. For example, tab 59 is shown facing vertically downward, which enables it to drop away from contact with piston 54 when not being held by the operator. In any other mounting position, it may be desirable to add a light spring between tab 59 and valve housing 50 to insure that tab 59 separates from piston 54 when not being used. Further, the inventive objects could also be achieved by using valving techniques other than the specific spool valve technique illustrated in the preferred embodiments.

What is claimed is:

1. Pressure sensing and responding apparatus for insertion in series relationship in a pressurized fluid line for stopping fluid flow on sensing a downstream pressure drop below a predetermined value, comprising:

a. a first fluid valve means for opening and closing said fluid line flow, said first fluid valve means having an adjustable spring-biased valving mechanism in a normally closed position and having an interior cylindrical chamber with end walls and with a slidable spool valving mechanism therein, one end of said spool valving mechanism having a compression spring biasing it away from an interior chamber end wall and the other end of said spool valving mechanism having a piston surface area;

b. a second fluid valve means for manually causing fluid flow in said fluid line, in parallel fluid flow connection relative to said first fluid valve means, said second fluid valve means having an interior cylindrical chamber with end walls, and said chamber having a slidable spool valve mechanism with a compression spring between an end wall of said chamber and an end of said slidable spool, said spring urging said spool in valve-closing position, and further comprising means for manually moving said spool into valve-opening position;

c. a pressure coupling passage having one opening in fluid contact with said first fluid valve means piston surface area, and a second opening in fluid contact with the downstream side of said first fluid valve means.

* * * * *